Jan. 1, 1957  M. ADLER  2,776,055
BLOOD FILTER WITH CLOT REMOVER
Filed Aug. 13, 1954

*INVENTOR.*
MYRON ADLER
BY
ATTORNEY

United States Patent Office 2,776,055
Patented Jan. 1, 1957

2,776,055

BLOOD FILTER WITH CLOT REMOVER

Myron Adler, New York, N. Y., assignor, by mesne assignments, to Medical Plastics, Inc., Jamaica, N. Y., a corporation of New York Application August 13, 1954, Serial No. 449,628

2 Claims. (Cl. 210—151)

The invention herein disclosed relates to filters such as used in the administration of blood, glucose and the like.

With filters currently used for the purpose it becomes necessary at times to shake the filter to remove clots of blood or lumps of glucose or other material that may be tending to clog the screening material and stop the flow.

Special objects of the invention are to provide a filter in which blood clots or other impeding media may be removed from the screen at any time and without need to shake or otherwise disturb the filter.

Further important objects of the invention are to provide the filter in a practical, small size, conveniently handled form having an extended screen surface and in which conditions at the screen may be observed at all times and the screen kept clear so as not to slow up or stop the flow of blood or other medium.

Further objects of the invention are to provide a filter having all the desirable attributes mentioned, which can be readily assembled and produced at reasonable cost and therefore be disposable in character.

Other desirable objects attained by the invention are set forth or will appear in the course of the following specification.

The drawing accompanying and forming part of the specification illustrates several of possible embodiments of the invention but structure may be further modified and changed as regards the immediate illustration, all within the true intent and scope of the invention as hereinafter defined and claimed.

Fig. 1 in the drawing is a front elevation of the filter with part of the front wall broken away to show the screen forming a partition wall separating the filter casing into inlet and discharge chambers;

Figure 1:
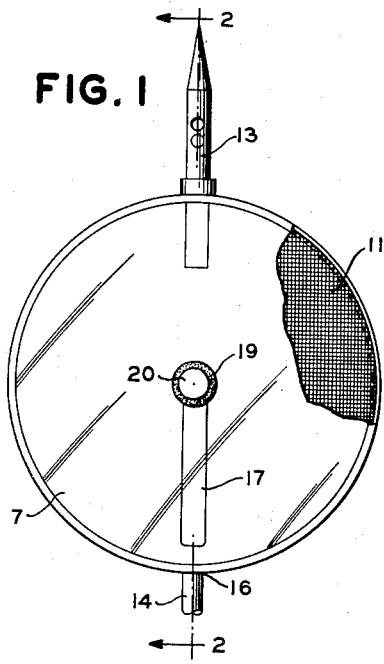

The casing of the filter is shown made up in pillbox form with front and back hollow sections 7 and 8 connected by telescopic joint 9 with the latter providing an internal shoulder 10 on the back section for the screen 11, which then is held in place by the flange 12 of the front section.

This flattened form of capsule provides for an extended screen area and made in clear plastic, affords full view of the screen and conditions of the inflowing and outgoing liquid. After assembly the two sections may be permanently secured by suitable plastic adhesive.

The front section is shown equipped with a cork piercing hollow inlet point 13 and the back section as having the necessary or usual flexible tubing 14 connected therewith.

Figure 4:
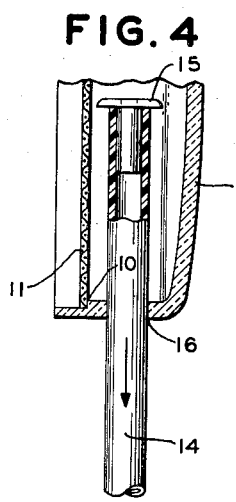
Fig. 4 is an enlarged broken sectional detail of the eyelet terminal construction for the flexible tubing.

To facilitate connection of the tubing the construction illustrated in Fig. 4 may be employed, this comprising an elongated flanged eyelet 15 which after the tubing is inserted through the opening 16 in the casing, is entered in the inner end of the tubing so that as the tubing is pulled back through the opening the eyelet will compress the surrounding portion of tubing and seal it against the wall of the opening, with the flange of the eyelet coming to rest against the inner wall of the casing. The eyelet thus serves both to seal the tubing and to secure it against pulling loose.

For clearing the screen of lumps, clots or other obstructions, a wiper blade 17 is provided, this being carried by a spindle 18 centrally rotatably sealed in a rubber or other resilient grommet 19 in the front wall of the casing. This spindle is shown as having an enlargement or knob 20 at the outer end providing a convenient finger-hold for rotating the blade.

Figure 2:
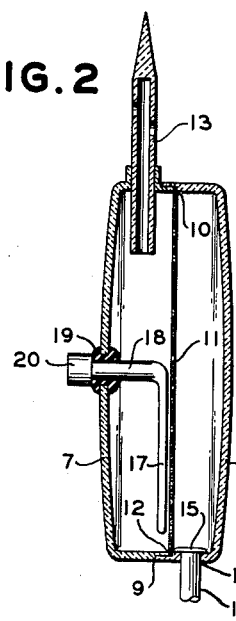
Fig. 2 is a vertical sectional view on substantially the plane of line 2—2 of Fig. 1.

Fig. 2 shows how the wiper blade may be set close to but short of immediate contact with the screen so as to clear away blood clot materials without forcing them into the mesh of the screen.

While the vertical type filter shown in Fig. 2 may generally be preferred, it is realized that a flat horizontal type may be found desirable for certain purposes.

Figure 5:
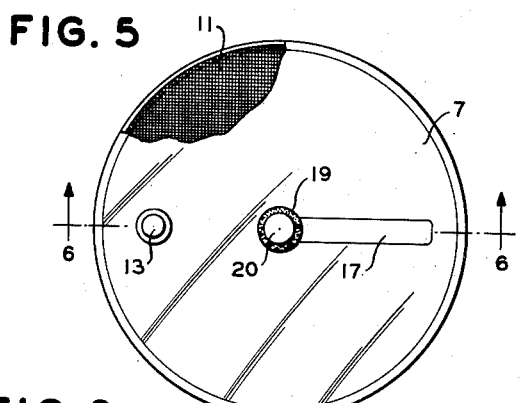
Figs. 5 and 6 are broken plan and cross-sectional views, respectively, of a horizontal type form of filter, Fig. 6 being taken on substantially the plane of line 6—6 of Fig. 5.
Figure 6:
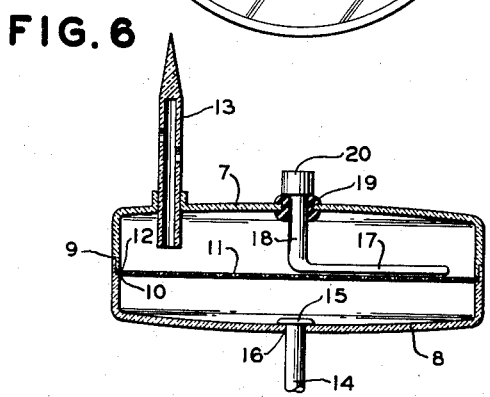

Accordingly, there is shown in Figs. 5 and 6 a horizontal form of the filter in which the inlet spear or point 13 is located directly in the front or what then becomes the top wall of the casing and the outlet tubing 14 is run from the back wall of the casing.

Figure 3:
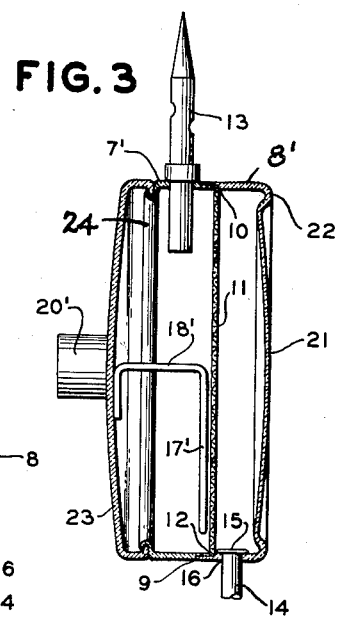
Fig. 3 is a side or edge view illustrating a modified form of the filter case, constructed with a flexible back wall, the latter broken and shown in section.

Fig. 3 shows how the back wall may be made flexible for pumping or agitating purposes, by forming it thin and outwardly bowed at the center at 21 and supported at the rim by a curved bead 22.

In the transparent plastic form equipped with the screen clearing device, the invention provides the highly desirable factor of safety since the filtering action may be observed at all times and the filter screen be kept clean to avoid any lessening or stoppage of flow.

The flat cylindrical form of the casing and the screen extending across the full interior provide a maximum of filtering surface for the size of the casing.

The inlet tube 13 is mounted in both the vertical and horizontal forms of the invention, Figs. 2 and 6, with the inner end clear of the screen and with space between the end and the screen for the sweep of the wiper journaled at the center of the casing.

The wiper may be supported and operated in different ways. Thus, by way of example, the top or end cover of the case may be mounted free to rotate and the wiper be fixedly attached to this rotatable part. All this is shown in Fig. 3, where the casing made up of the telescopically joined front and back sections 7' and 8', is shown as having a rotatable front cover portion 23 provided with a knob or handle 20' for turning it, and having the wiper 17' fixedly attached thereto at 18'.

The front cover section 23 is shown as having an interfitting flange and groove rotatable slip connection 24 with the stationary front casing portion 7'.

What is claimed is:

1. A blood filter and clot remover comprising a cylindrical casing of pill-box formation having cylindrical end sections telescopically connected and provided at their meeting edges with opposed internal, coplanar annular shoulders, a filter screen held in flat condition between said opposed shoulders and separating opposite ends of the casing into inlet and outlet chambers, a blood inlet in one of said end chambers, a blood outlet from the other end chamber and a wiper for the screen, said wiper being mounted on the inlet chamber end section of the casing, rotatable about the axis of the casing over the face of the filter screen in the inlet chamber and having means external of the casing for effecting screen clearing rotation of the wiper, said companion sections of the casing being of transparent material enabling constant observation of inflow and outflow of blood and operation of the wiper to best advantage to keep the screen clear of blood clots and thereby to avoid interruption of flow of blood through the filter.

2. The invention according to claim 1, in which the inlet end section of the casing has a grommet at the center and the wiper has a stem journaled in said grommet and is provided at the outside with a finger knob providing the means aforesaid for rotating the wiper as required.

References Cited in the file of this patent

UNITED STATES PATENTS

| | | |
|---|---|---|
| 192,313 | Watson | June 19, 1877 |
| 217,338 | Carbine | July 8, 1879 |
| 1,463,067 | Crary | July 24, 1923 |
| 2,113,823 | Booth | Apr. 12, 1938 |
| 2,232,025 | Glisan | Feb. 18, 1941 |
| 2,314,315 | Scheele | Mar. 16, 1943 |
| 2,532,560 | Lamb | Dec. 5, 1950 |
| 2,571,059 | Puschelberg | Oct. 9, 1951 |
| 2,586,513 | Butler | Feb. 19, 1952 |

FOREIGN PATENTS

| | | |
|---|---|---|
| 105,149 | Austria | Dec. 27, 1926 |
| 517,251 | Belgium | Feb. 14, 1953 |